US010600309B1

(12) United States Patent
Holiday (10) Patent No.: US 10,600,309 B1
(45) Date of Patent: Mar. 24, 2020

(54) SYSTEM AND METHOD FOR LOCATING A LOST ARTICLE

(71) Applicant: Mazy E. Holiday, Birmingham, AL (US)

(72) Inventor: Mazy E. Holiday, Birmingham, AL (US)

( * ) Notice: Subject to any disclaimer, the term of this patent is extended or adjusted under 35 U.S.C. 154(b) by 0 days.

(21) Appl. No.: 16/117,643

(22) Filed: Aug. 30, 2018

(51) Int. Cl.
| | |
|---|---|
| G08B 21/24 | (2006.01) |
| H04W 4/02 | (2018.01) |
| G01S 19/39 | (2010.01) |
| H04L 12/26 | (2006.01) |
| H04W 68/10 | (2009.01) |
| H04W 4/029 | (2018.01) |

(52) U.S. Cl.
CPC .............. *G08B 21/24* (2013.01); *G01S 19/39* (2013.01); *H04L 43/0811* (2013.01); *H04W 4/023* (2013.01); *H04W 4/029* (2018.02); *H04W 68/10* (2013.01)

(58) Field of Classification Search
CPC ...... G08B 21/24; H04W 4/029; H04W 4/023; H04W 68/10; H04L 43/0811; G01S 19/39
See application file for complete search history.

(56) References Cited

U.S. PATENT DOCUMENTS

| | | | |
|---|---|---|---|
| 5,331,990 | A | 7/1994 | Hall et al. |
| 6,011,481 | A | 1/2000 | Luther et al. |
| 6,433,690 | B2 | 8/2002 | Petelenz et al. |
| 7,616,110 | B2 | 11/2009 | Crump et al. |
| 9,044,171 | B2 | 6/2015 | Venkatraman et al. |
| 2007/0159332 | A1 | 7/2007 | Koblasz |
| 2008/0207357 | A1* | 8/2008 | Savarese ............ A63B 24/0021 473/407 |
| 2010/0285771 | A1 | 11/2010 | Peabody |
| 2012/0009943 | A1* | 1/2012 | Greenberg ............ A01K 15/023 455/456.1 |
| 2012/0101411 | A1 | 4/2012 | Hausdorff et al. |
| 2013/0135097 | A1 | 5/2013 | Doezema |
| 2014/0194702 | A1 | 7/2014 | Tran |
| 2014/0213301 | A1* | 7/2014 | Evans ..................... H04W 4/21 455/456.3 |

(Continued)

OTHER PUBLICATIONS

PCT International Search Report and PCT Written Opinion, dated Dec. 20, 2018; 16 pages.

*Primary Examiner* — Steven Lim
*Assistant Examiner* — Mancil Littlejohn, Jr.
(74) *Attorney, Agent, or Firm* — Lanier Ford Shaver & Payne, PC; Gerald M. Walsh (57) ABSTRACT

A system for locating an article having a finding unit attached thereto. The finding unit has a transmitter which transmits a wireless signal continuously. Through a software application in the smartphone the wireless signal is monitored continuously when the smartphone is in range of the transmitter. If a User and his or her smartphone go beyond the range of the transmitter, the smartphone sends a notification to the smartphone's display including a GPS location of the smartphone when the smartphone most recently did not receive the wireless signal. The location provides where the article was lost. A software program is provided by which a User can send a message through the smartphone to one or more contacts for assistance. The finding unit can also have a wireless receiver to receive a wireless signal from the smartphone to activate audio and visual alarms.

22 Claims, 6 Drawing Sheets

(56) References Cited

U.S. PATENT DOCUMENTS

| | | | |
|---|---|---|---|
| 2014/0313035 A1* | 10/2014 | Holzapfel | G08B 13/1427 |
| | | | 340/568.6 |
| 2015/0015442 A1 | 1/2015 | Kolb et al. | |
| 2015/0084745 A1* | 3/2015 | Hertz | H04W 4/12 |
| | | | 340/10.3 |
| 2015/0356861 A1* | 12/2015 | Daoura | G08B 21/0269 |
| | | | 340/539.13 |
| 2018/0227393 A1 | 8/2018 | Daub | |

* cited by examiner

SYSTEM AND METHOD FOR LOCATING A LOST ARTICLE

FIELD OF THE INVENTION

The present invention relates to location devices for articles and, more particularly, to a location device using a Bluetooth wireless transmitter on an article in combination with a smartphone having global positioning system (GPS) functions.

BACKGROUND OF THE INVENTION

A common method of tracking an article if it gets lost is to attach a tag to the article with a name, phone number, and address provided thereon. The owner of the lost article hopes that a finder of the lost article will contact the owner. This method is not adequate or satisfactory because it usefulness is based on chance. U.S. Patent Application Publication No. 2013/0135097 discloses a device that can be contained within an article having a global positioning system (GPS) receiver and transmitter that is used to track the article's location over a long distance. The device also has a wireless Bluetooth transmitter and receiver so that the device can communicate with a cellular telephone and can receive a signal to produce a sound to locate the article over a short distance.

Articles which are commonly used, relatively inexpensive, personal, and easy to lose or misplace could be improved by having an inexpensive location feature. Providing a GPS tracking device with these articles often is not commercially feasible or practical. An example of such an article is a walking cane. Walking canes are used by people with physical impairments that require them to have additional support while walking. They are also used by visually impaired people to evaluate the surface before them as they walk. Walking canes provide a shaft that reaches from a convenient hand holding height down to the ground next to or in front of the walker. A single or multi-legged foot supports the cane on the ground and a handle provides easy control of the cane by a User. Canes can be relatively inexpensive, and a User may take a cane everywhere the User goes. Constructing a cane with a (WS tracking system is expected to make the cane too expensive. What is needed is a simple, inexpensive device to insert into or onto a cane, for example, that will alert the User of the cane (and others if desired) that the cane is lost and that will provide its location.

SUMMARY OF THE INVENTION

This invention provides a system for locating an article that is lost. The system has a finding unit with a wireless transmitter and is attached to or contained within the article. The wireless transmitter transmits a wireless signal continuously. This system includes a smartphone having a GPS receiver. A software application in the smartphone receives the wireless signal from the wireless transmitter continuously when the smartphone is within range of the wireless transmitter. The software application sends a notification to a display of the smartphone when the smartphone does not receive the wireless signal. The software application obtains a GPS location where the smartphone most recently did not receive the wireless signal from the wireless transmitter. The software application continuously verifies reception of the wireless signal. When the wireless signal from the wireless transmitter is not received by the smartphone, the notification is also sent to a provider server through the internee and to other smart phones. The notification includes access to the GPS location. The finding unit has a wireless receiver to receive a wireless signal from the smartphone to generate a visual and/or audio alert from visual and audio alert devices that are on or within the article.

The software application is downloaded into the smartphone from a provider server and provides on the display of the smartphone a selection of icons. The icons provide commands to find the location, to allow entry of contact information by a User, to send the notification to contacts selected from the contact information, to call an emergency number, and to activate an audio and/or visual signal through the wireless receiver on or in the article.

This invention also provides a method of finding a lost article which includes attaching a finding unit having a wireless transmitter to the article, Wherein the wireless transmitter transmits a wireless signal continuously. A smartphone has a software application to locate the article by supporting several functions as follows. The smart phone receives the wireless signal continuously from the wireless transmitter when the smartphone is within range of the wireless transmitter. A notification is sent to a display of the smartphone when the smartphone does not receive the wireless signal from the wireless transmitter. A GPS location of the smartphone is obtained when the smartphone most recently did not receive the wireless signal from the wireless transmitter. The notification provides access to the GPS location of the smartphone at that time, which is the location where the article was misplaced or lost.

The smartphone also sends the notification to a provider server and to other smart phones. The smartphone transmits a wireless signal to a wireless receiver within the finding unit to generate a visual and/or audio alert from visual and audio alert devices on or within the article. This alert allows the User to find the article when the User is within audio or visual range of the article.

A User downloads the software application into a smartphone from a provider server and selects, on the display of the smartphone, commands which include finding the GPS location, entering contact information, sending the notification to contacts selected from the contact information, calling an emergency number, and activating an audio or visual device on or in the article through a wireless receiver within the finding unit.

This invention further provides a cane having a finding unit with a wireless connection to a smart phone. The cane has a handle and a shaft with the finding unit located, preferably, in the handle and has all the features and functions described above for locating the cane if it is lost or misplaced.

An advantage of the present invention is an inexpensive finding unit that can be used with an existing smartphone to find an article's location.

Another advantage is a simple software application to operate the location system that is easy to download into a smartphone and easy to operate.

Another advantage is the use of wireless Bluetooth technology to monitor the location of an article when the article transmits a wireless signal to a smartphone.

Another advantage is a method of notifying a User and the User's contacts when and where the article was lost, using the finding unit, the User's smartphone, a provider server, and the internet.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

The present invention uses a smart phone in the system for finding an article that is lost. A smartphone is a handheld personal computer. It possesses extensive computing capabilities, including high-speed access to the Internet using both \Vi-Fi and mobile broadband. Most, if not all, smartphones are also built with support for Bluetooth wireless transmission and satellite navigation (GPS). Modern smartphones have a touchscreen color display with a graphical User interface that covers the front surface and enables the User to use a virtual keyboard to type and press onscreen icons. Interaction is mostly done using touch, besides a few physical buttons. Smartphones function using a rechargeable lithium-ion or lithium-polymer battery.

Smartphones use a mobile operating system and can process a variety of software components, known as applications or "apps". Most basic apps (e.g. event calendar, camera, web browser) come pre-installed with the system, while others are available for download. Apps, and the operating system in the smartphone, can receive additional functionality through updates.

Figure 1:
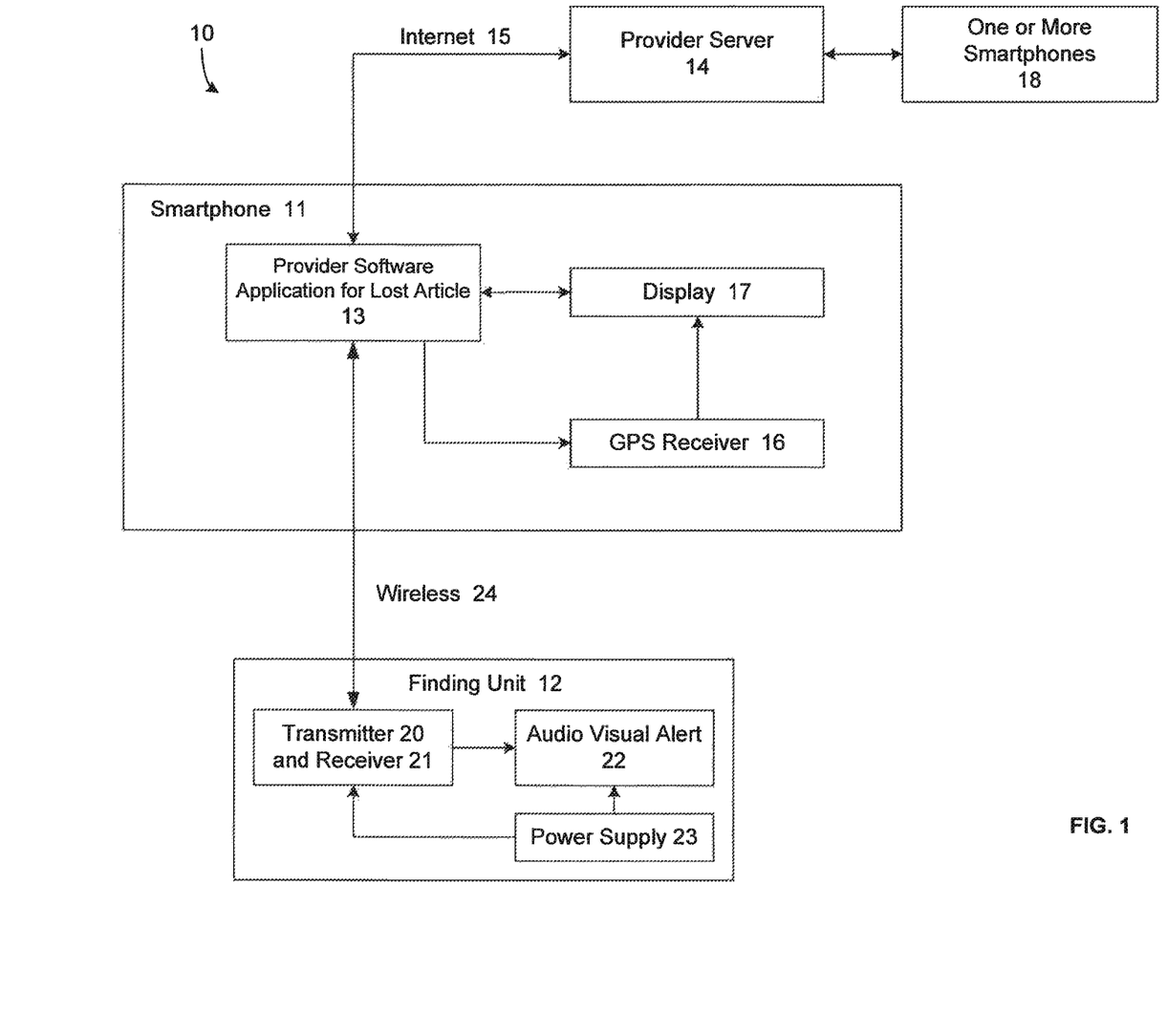
FIG. 1 is a block diagram of the system of the present invention for locating an article that is lost, illustrating electronic and software units in a smartphone and in an article.

FIG. 1 is a block diagram of the system 10 of the present invention for locating an article that is lost illustrating electronic and software units in a smartphone 11 and in a finding unit 12. An application for finding and article that is lost (software application 13) is downloaded from a provider server 14 through the internet 15 or from any other source in the Cloud. The software application 13 can signal a GPS receiver 16 to find and record the location of the smartphone 11. The GPS receiver 16 can display the location on the display 17 on the smartphone 11, for example with map, or on several smartphones 18. The location information of the smartphone 11 can also be sent to the software application 13. The article has a finding unit 12 which has a wireless transmitter 20, a wireless receiver 21, alert devices 22, such as audio and/or visual alerts, and a power supply 23 on or contained within the cane 12. A wireless signal 24 from the transmitter 24 is detected through the software application 13 and the software application 13 can send a wireless signal to the receiver 21 to activate the audio and/or visual alerts 22 to provide, for example, flashing and colored lights and ring, chime, or music sounds.

Figure 2:
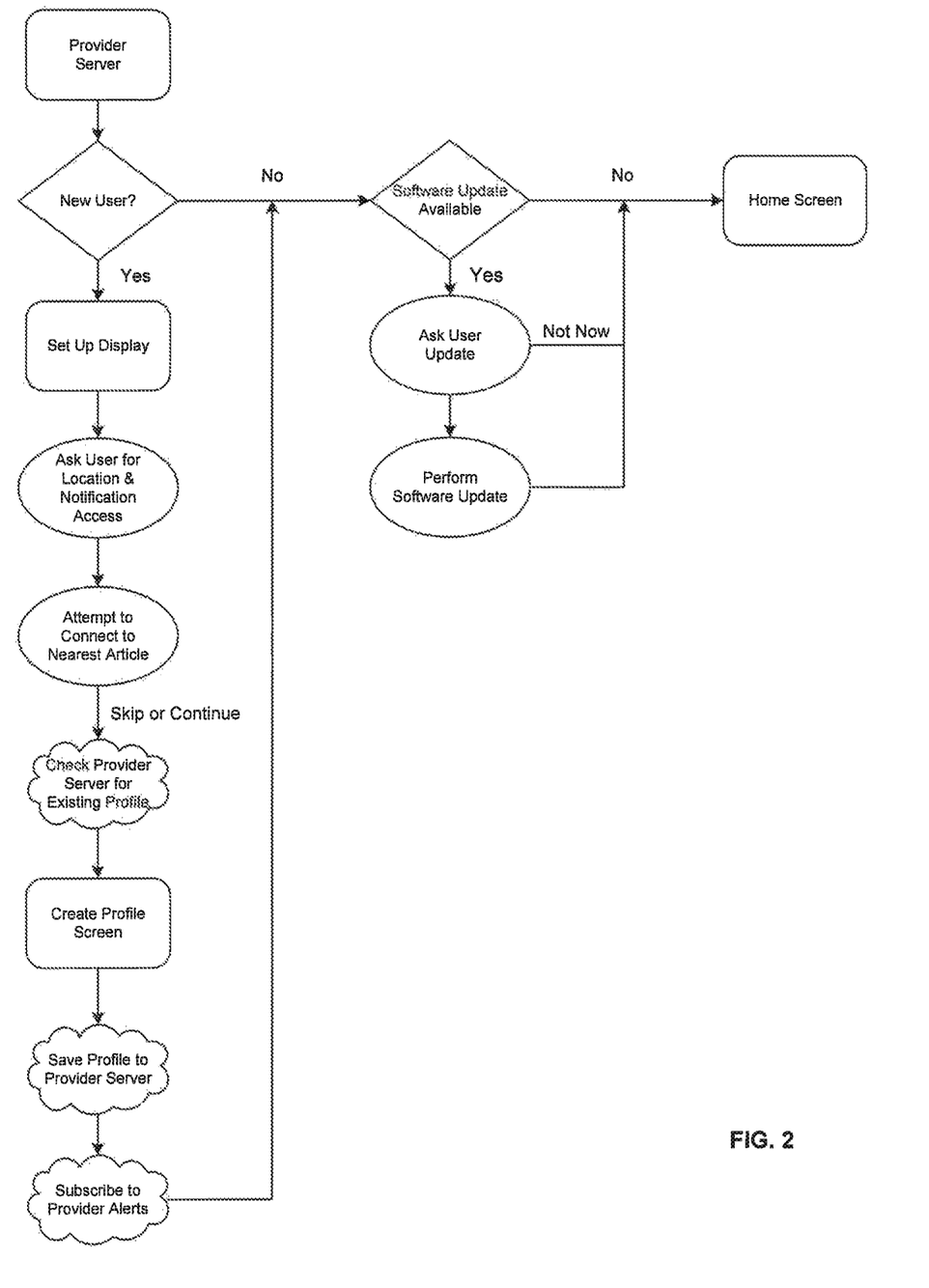
FIG. 2 is a flow chart for downloading and activating a software application for the location of a lost article.

FIG. 2 is a flow chart for downloading and activating a software application for the location of a lost article, such as a lost cane. A provider of the software application 13 has a server 14 to allow a new User of the system 10 to download the software application 13 or its updates into a smartphone 11 over the internet. The provider will also provide the finding unit 12 for placing on or within the article (see FIG. 6). A new User downloads a software application 13 and is prompted to set up the display on the smartphone 11. The User is asked to enter his or her address and phone number. If the User obtained a finding unit 12 and attached it to an article or purchased an article with a finding unit 12 installed in the article (see FIG. 6), the new User can verify that the smartphone 11 detects the wireless signal 24 from the wireless transmitter 20 in the finding unit 12. The new User is asked to provide additional User profile information. The new User profile is saved on the provider server 14. The User may also subscribe to other features offered by the provider such as alerts and notifications. When updates to the software application 13 are available the User can be asked if he or she wants an update and if so an over the air device firmware update is provided.

Figure 3:
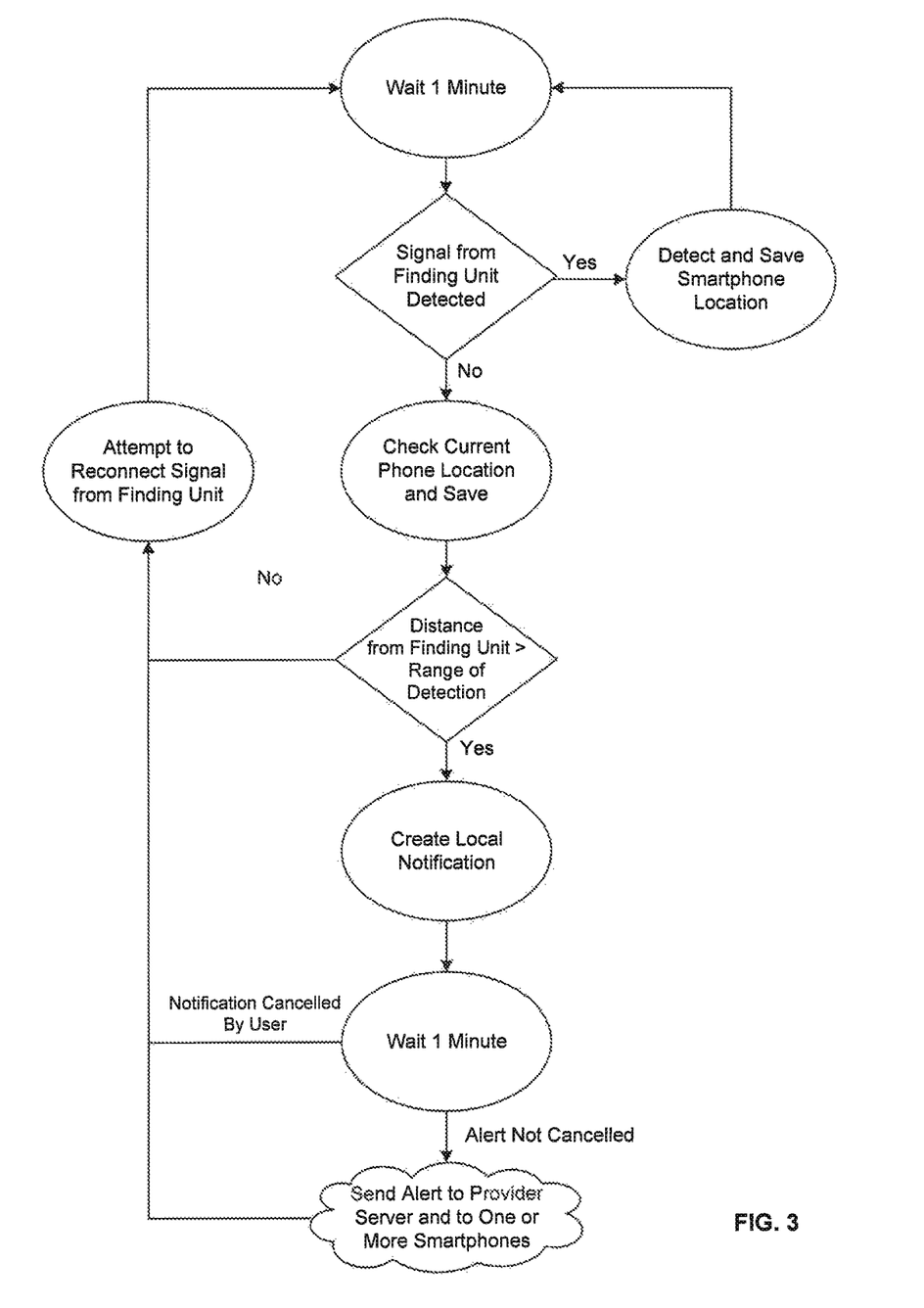
FIG. 3 is a flowchart of the algorithm in the software application for verification of a wireless signal being transmitted from a wireless transmitter in or on the article to the smartphone, for continuously monitoring the location of the finding unit, and for sending notifications to the smartphone, to additional smartphones, and/or to the internet of a service provider.
Figure 4:
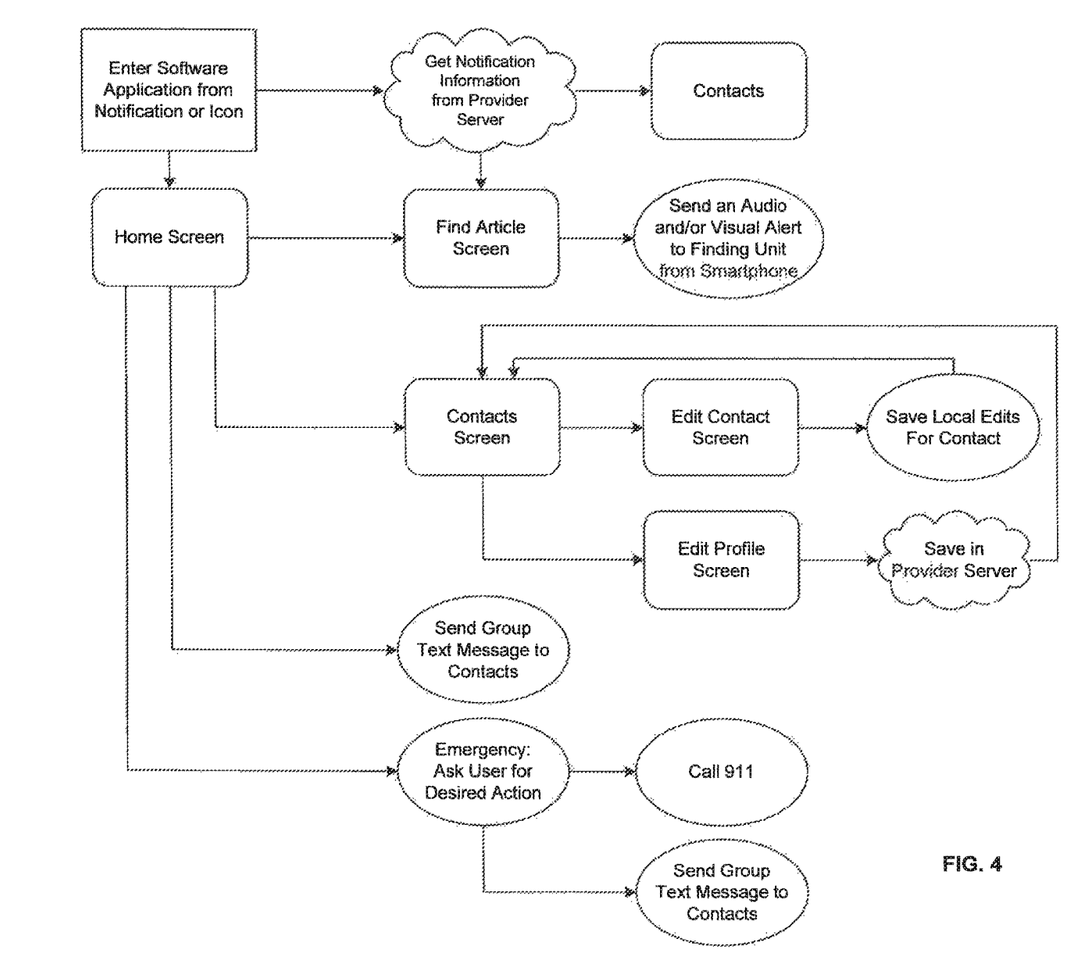
FIG. 4 is a flow chart of the activation of the software application to access commands on the display of the smart phone for locating when and where the article was lost, for entering contact information, for sending messages to contacts, and for calling an emergency phone number.

FIG. 3 is a flowchart of the algorithm in the software application for verification receipt of a wireless signal 24 being transmitted from the finding unit 12 to a User's smartphone 11, for continuously monitoring the location of the smartphone 11, and for sending a notification to the smartphone 11, to additional smartphones 18, and/or to a provider server 14 through the internet 15. At a selected time interval, for example, one minute, the software application 13 verifies the detection of the wireless signal 24 from the wireless transmitter 20 in the finding unit 12. If the wireless signal 24 is detected, the location of the smartphone 11 is detected and saved. If no wireless signal 24 is detected, the location of the smartphone 11 is detected and saved at that time. The allowed maximum distance of detection of the wireless signal 24 by the smartphone 11 ranges from 30 to 1000 feet, depending on the type of wireless transmitter 20. If no wireless signal 14 is detected but the finding unit 12 is within range of detection of the smartphone 11, the smartphone 11 will attempt to connect to the finding unit 12 at a selected time interval, for example, one minute. If no wireless signal 24 is detected and the distance of the finding unit 12 is greater than the range of detection by the smartphone 11, the software application 13 provides a notification to the display 17 of the User's smartphone 11. The User is given an option to cancel the notification within a selected time interval, for example, one minute. If the User cancels the notification, the software application 13 attempts to reconnect with the wireless signal 24. If the notification is not cancelled by the User, a notification is sent via the internet 15 to the provider server 14 or to any other desired location in the Cloud or to other smartphones 18.

Figure 5A:
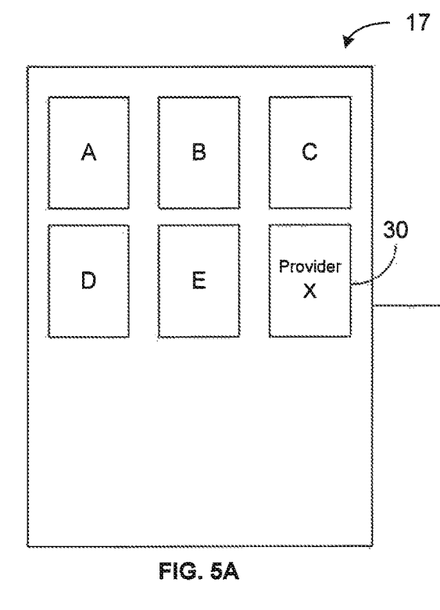
FIGS. 5A-5D illustrates examples of displays on the smartphone.
Figure 5B:
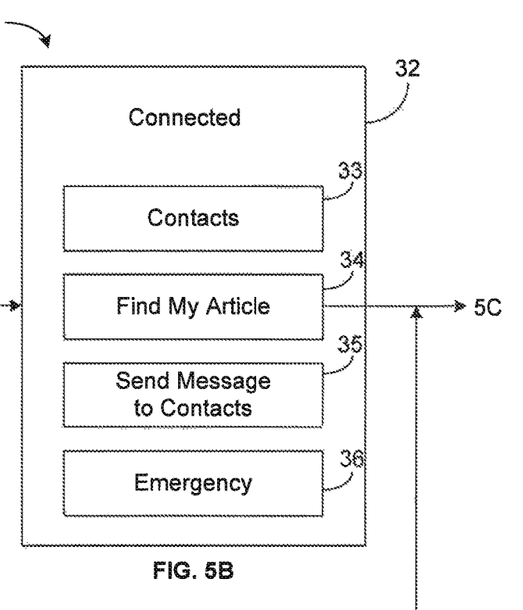
Figure 5C:
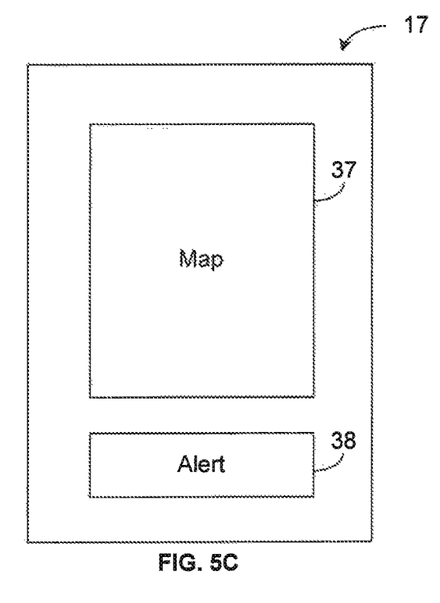
Figure 5D:
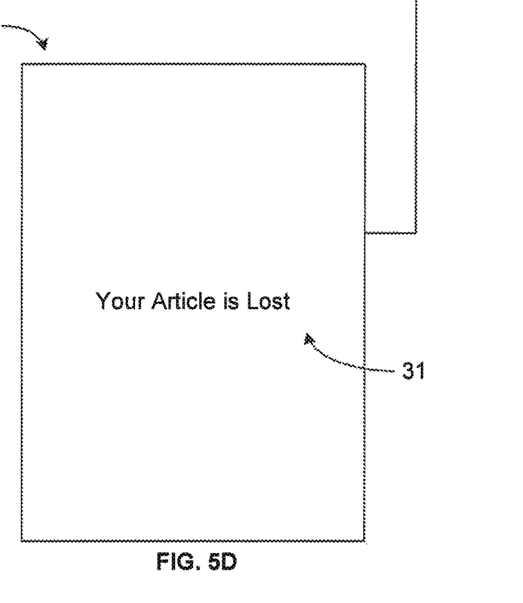

Regarding FIGS. 4 and 5A-5D, FIG. 4 is a flow chart of the activation of the software application 13 to access commands on the display 17 of the smart phone 11 for locating where the article was lost, for entering contact information, for sending messages to contacts, and for calling an emergency phone number. FIGS. 5A-5D) show examples of displays 17 on the smartphone 11. The software application 13 is entered by tapping its icon 30 on the smartphone display 17, provided to the User when the software application 13 was downloaded (FIG. 5A). The software application 13 is also entered by tapping the notification 31 sent to the display 17 (FIG. 5D). A home screen 32 (FIG. 5B) provides four choices: contacts 33, find my article 34, send message to contacts 35, and emergency 36. When find my article 34 is selected (tapped) a map is displayed showing the location where the wireless signal 24 from the finding unit 12 was most recently not detected (lost), providing an indication as to where the article was lost (FIG. 5C). Also provided is an alert icon 38 which, when tapped, causes audio and visual devices to be activated. A User can then find the article by hearing or seeing the audio and/or visual signals if the User is within hearing or visual distance of the article. A User may also return to a location provided by the map 37 to look for the article, using the alert icon 38.

When the contacts icon 33 is selected a User can enter contact information, such as names, Phone numbers, and addresses, and can edit the information which can be stored in the provider server 14. The User can also enter and edit his or her own contact information which will be stored in the provider server 14. When the send message to contacts icon 35 is selected the message function in the smartphone 11 is provided. The User can send a message to one or more contacts describing his or her situation. The notification 31 can also be sent directly to contacts from the provider server 14. When the emergency icon 36 is selected the User has the option of calling a 911 number or sending an emergency message to contacts.

Figure 6:
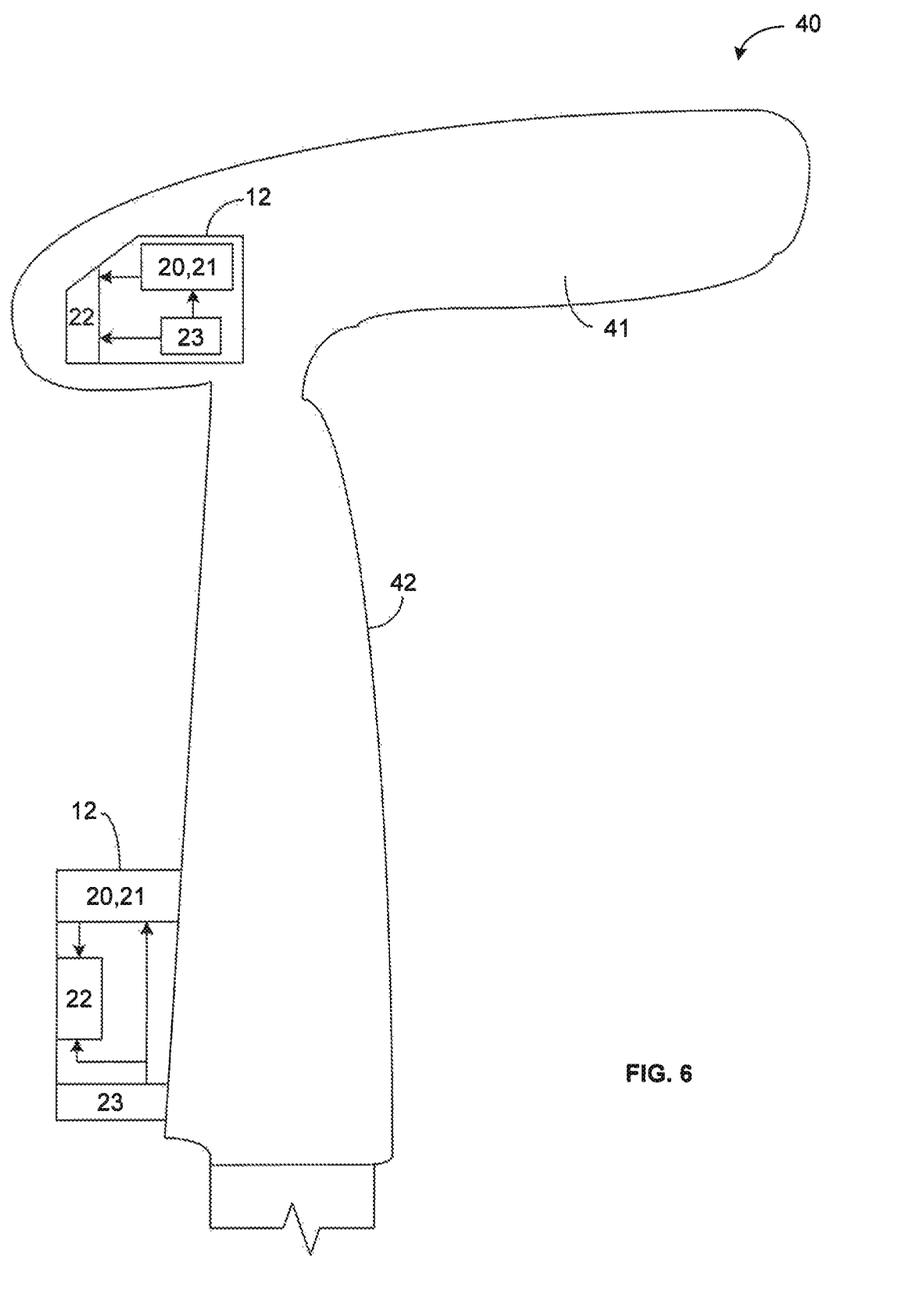
FIG. 6 provides a side, sectional view of a cane which has a finding unit positioned in a handle or attached on a shaft of the cane.

FIG. 6 provides an example of a cane 40 as an article which has a finding unit 12 attached thereto or contained therein. The finding unit 12 can be contained within in the handle 41 of the cane 40 or it can be attached to the exterior of the cane 40, on the shaft 42, for example. The range of the wireless transmitter may be set at 30 feet, for example. A User has a smartphone with the software application downloaded therein and active. The User may mistakenly leave the cane 40 in a first room and moves to a second room which is more than 30 feet from the first room. The User's smartphone will send a notification to the smartphone's display. The User taps the notification on the display, presses the alert icon, and finds the cane 40 from the audio or visual alert. The User can cancel the notification within one minute. If the User does not cancel the notification, one or more of the User's contacts may also receive a notification and signal an alert on the location unit for the User to hear or see. Likewise, if a User loses the cane 40 or the smartphone in another location, such as a store, a notification will go the User's smart phone and to the contacts' smartphones. The smartphones will receive a map on the display when the notification is tapped and the location of the store will be displayed. When the User or a contact goes to the store to retrieve the cane 40 the cane 40 can be located with the alert command.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, any type of suitable smartphone may be used with the finding unit. The application software can communicate with any location in the Cloud. The finding unit can be used with any article to which it can be attached or contained within.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A system for locating an article that is lost, comprising:
   a) a finding unit having a wireless transmitter, said finding unit attached to or contained within the article wherein the wireless transmitter transmits a wireless signal continuously;
   b) a smartphone of a user having a GPS receiver which continuously monitors the location of the smartphone;
   c) a software application in the smartphone, wherein the smartphone receives said wireless signal directly from the wireless transmitter continuously when the smartphone is within range of the wireless transmitter; wherein the software application in the smartphone sends a notification directly to a display of the smartphone of the user that no wireless signal is being detected, at the time when the smartphone does not receive said wireless signal directly from the wireless transmitter in the finding unit; and wherein the GPS receiver directly displays on the display of the smartphone the location of the smartphone at the time when the smartphone most recently did not receive said wireless signal directly from the wireless transmitter in the finding unit; and
   d) an icon is displayed on the display of the smart phone at the time when the smartphone most recently did not receive said wireless signal directly from the wireless transmitter in the finding unit, said icon being used to call an emergency number when the icon is selected by the user.

2. The system of claim 1 wherein the software application continuously verifies reception of said wireless signal from the wireless transmitter and wherein, when said wireless signal from the wireless transmitter is not received by the smartphone, said notification is also sent to a provider server and to other smart phones.

3. The system of claim 1, further comprising said finding unit having a wireless receiver to receive a wireless signal from the smart phone to generate an alert from one or more alert devices on or within the article.

4. The system of claim 1 wherein the software application is downloaded into the smartphone from a provider server and provides on the display of the smartphone a selection of icons which provide commands to find said location, to allow entry of contact information by a user, to send the notification to contacts selected from said contact information, and to activate an alert device through a wireless receiver in the finding unit.

5. A system for locating an article that is lost, comprising:
   a) a finding unit having a wireless transmitter, said finding unit attached to or contained within the article wherein the transmitter transmits a wireless signal continuously;
   b) a smartphone of a user having a GPS receiver which continuously monitors the location of the smartphone;
   c) a software application in the smartphone, wherein the smartphone receives said wireless signal directly from the wireless transmitter continuously when the smartphone is within range of the wireless transmitter; wherein the software application in the smartphone sends a notification directly to a display of the smartphone of the user that no wireless signal is being detected, at the time when the smartphone does not receive said wireless signal directly from the wireless transmitter in the finding unit; wherein the GPS receiver directly displays on the display of the smartphone the location of the smartphone at the time when the smartphone most recently did not receive said wireless signal directly from the wireless transmitter in the finding unit, wherein the software application continuously verifies reception of said wireless signal from the wireless transmitter; and wherein, when said wireless signal is not received by the smartphone, said notification is also sent to a provider server and to other smart phones; and d) an icon is displayed on the display of the smart phone at the time when the smartphone most recently did not receive said wireless signal directly from the wireless transmitter in the finding unit, said icon being used to call an emergency number when the icon is selected by the user.

6. The system of claim 5, further comprising said finding unit having a wireless receiver to receive a wireless signal from the smart phone to generate an alert from one or more alert devices on or within the article.

7. The system of claim 5 wherein the software application is downloaded into the smartphone from a provider server and provides on the display a selection of icons which provides commands to find said location; to allow entry of contact information by a user; to send the notification to contacts selected from said contact information; and to activate an alert on or in the article through a wireless receiver in the finding unit.

8. A system for locating an article that is lost, comprising:
   a) a finding unit having a wireless transmitter, said finding unit attached to or contained within the article wherein the wireless transmitter transmits a wireless signal continuously;
   b) a smartphone of a user having a GPS receiver which continuously monitors the location of the smartphone;
   c) a software application in the smartphone, wherein the smartphone receives said wireless signal directly from the wireless transmitter continuously when the smartphone is within range of the wireless transmitter; wherein the software application in the smartphone sends a notification directly to a display of the smartphone of the user that no wireless signal is being detected, at the time when the smartphone does not receive said wireless signal directly from the wireless transmitter in the finding unit; wherein the GPS receiver directly displays on the display of the smartphone the location of the smartphone at the time when the smartphone most recently did not receive said wireless signal directly from the wireless transmitter in the finding unit, wherein the software application continuously verifies reception of said wireless signal from the wireless transmitter; and wherein, when said wireless signal from the wireless transmitter is not received by the smartphone, said notification is also sent to a provider server and to other smart phones;
   d) an icon is displayed on the display of the smart phone when the smartphone most recently did not receive said wireless signal directly from the wireless transmitter in the finding unit, said icon being used to call an emergency number when the icon is selected by the user;
   e) said finding unit having a wireless receiver to receive a wireless signal from the smart phone to generate an alert from one or more alert devices on or within the article; and
   f) the software application being downloaded into the smartphone from a provider server and providing on the display a selection of icons, said icons providing commands to find said location, to allow entry of contact information by a user, to send the notification to contacts selected from said contact information, and to activate an alert device through the wireless receiver.

9. A method for locating an article that is lost, comprising:
   1) attaching a finding unit having a wireless transmitter to the article, the wireless transmitter transmitting a wireless signal continuously;
   2) providing to a user a smart phone having a software application to locate the article, said smart phone having a UPS receiver which continuously monitors the location of the smartphone and said finding unit having a wireless receiver to receive a wireless signal from the smart phone to generate an alert from one or more alert devices on or within the article;
   3) receiving said wireless signal in the smartphone, by operation of the software application, from the wireless transmitter continuously when the smartphone is within range of the wireless transmitter;
   4) sending a notification directly to a display of the smartphone of the user that no wireless signal is being detected, by operation of the software application in the smartphone, at the time when the smartphone does not receive said wireless signal directly from the wireless transmitter in the finding unit;
   5) displaying directly by the GPS receiver the location of the smartphone, on the display of the smartphone at the time when the smartphone most recently did not receive said signal directly from the wireless transmitter in the finding unit; and
   6) traveling to said location of the smartphone and locating the lost article with an alert from said one or more alert devices by generating said wireless signal from said smartphone; and
   selecting an emergency icon by the user on the display of the smart phone and calling an emergency number.

10. The method of claim 9, further comprising continuously verifying reception of said wireless signal from the wireless transmitter and sending said notification to a provider server and to other smart phones, by action of the software application, when said wireless signal from the wireless transmitter is not received by the smartphone.

11. The method of claim 9, further comprising transmitting a wireless signal from said smartphone, by action of the software application, to a wireless receiver within the finding unit to generate an alert from one or more alert devices on or within the article.

12. A method for locating an article that is lost, comprising:
   1) Attaching a finding unit having a wireless transmitter to the article, the wireless transmitter transmitting a wireless signal continuously;
   2) providing to a user a smart phone having a software application to locate the article, said smart phone having a GPS receiver which continuously monitors the location of the smartphone and said finding unit having a wireless receiver to receive a wireless signal from the smart phone to generate an alert from one or more alert devices on or within the article;

3) receiving said wireless signal in the smartphone, by operation of the software application, from the wireless transmitter continuously when the smartphone is within range of the wireless transmitter;

4) sending a notification directly to a display of the smartphone of the user that no wireless signal is being detected, by operation of the software application in the smartphone, at the time when the smartphone does not receive said wireless signal directly from the wireless transmitter in the finding unit;

5) displaying directly by the GPS receiver the location of the smartphone, on the display of the smartphone at the time when the smartphone most recently did not receive said signal directly from the wireless transmitter in the finding unit; 6) continuously verifying reception of said wireless signal from the wireless transmitter and sending said notification to a provider server and to other smart phones, by action of the software application, when said wireless signal from the wireless transmitter is not received by the smartphone; and traveling to said location of the smartphone and locating the lost article with an alert from said one or more alert devices by generating said wireless signal from said smartphone; and selecting an emergency icon by the user on the display of the smart phone and calling an emergency number.

13. The method of claim 12, further comprising transmitting a wireless signal from said smartphone, by action of the software application, to a wireless receiver within the finding unit to generate an alert from one or more alert devices on or within the article.

14. A method for locating an article that is lost, comprising:

1) Attaching a finding unit having a wireless transmitter to the article, the wireless transmitter transmitting a wireless signal continuously;

2) providing to a user a smart phone having a software application to locate the article, said smart phone having a GPS receiver which continuously monitors the location of the smartphone and said finding unit having a wireless receiver to receive a wireless signal from the smart phone to generate an alert from one or more alert devices on or within the article;

3) receiving said wireless signal in the smartphone, by operation of the software application, from the wireless transmitter continuously when the smartphone is within range of the wireless transmitter;

4) sending a notification directly to a display of the smartphone of the user that no wireless signal is being detected, by operation of the software application in the smartphone, at the time when the smartphone does not receive said wireless signal directly from the wireless transmitter in the finding unit;

5) displaying directly by the GPS receiver the location of the smartphone on the display of the smartphone, at the time when the smartphone most recently did not receive said signal directly from the wireless transmitter in the finding unit;

6) continuously verifying reception of said wireless signal from the wireless transmitter and sending said notification to a provider server and to other smart phones, by action of the software application, when said wireless signal from the wireless transmitter is not received by the smartphone;

7) transmitting a wireless signal from said smartphone, by action of the software application, to a wireless receiver within the finding unit to generate an alert from one or more alert devices on or within the article;

8) selecting an emergency icon by the user on the display of the smart phone and calling an emergency number; and 9) traveling to said location of the smartphone and locating the lost article with an alert from said one or more alert devices by generating said wireless signal from said smartphone.

15. A cane having a finding unit with a wireless connection to a smart phone of a user, comprising:

a) a handle and a shaft;

b) the finding unit having a power supply and a wireless transmitter, said finding unit being attached to the cane or contained within the cane, wherein the wireless transmitter transmits a wireless signal continuously;

c) a software application and a GPS receiver in the smartphone of the user, wherein the smartphone receives said wireless signal directly from the wireless transmitter in the finding unit continuously when the smartphone is within range of the wireless transmitter; wherein the GPS receiver continuously monitors the location of the smart phone; wherein the software application of the smartphone sends a notification directly to a display of the smartphone that no wireless signal is being detected, at the time when the smartphone does not receive said wireless signal directly from the wireless transmitter in the finding unit; and wherein the GPS receiver directly displays on the display of the smartphone the location of the smartphone at the time when the smartphone most recently did not receive said wireless signal directly from the wireless transmitter in the finding unit; and d) an icon is displayed on the display of the smart phone at the time when the smartphone most recently did not receive said wireless signal directly from the wireless transmitter in the finding unit, said icon being used to call an emergency number when the icon is selected by the user.

16. The cane of claim 15 wherein the software application continuously verifies reception of said wireless signal from the wireless transmitter and wherein, when said wireless signal from the wireless transmitter is not received by the smartphone, said notification is also sent to a provider server and to other smart phones.

17. The cane of claim 15, further comprising a wireless receiver in the finding unit to receive a wireless signal from the smart phone to generate an alert from one or more alert devices on or in the cane.

18. The cane of claim 15 wherein the software application is downloaded into the smartphone from a provider server and provides on said display of the smartphone a selection of icons which provide commands to find said location, to allow entry of contact information by a user, to send said notification to contacts selected from said contact information, and to activate one or more alert devices on or in the cane.

19. A cane having a finding unit with a wireless connection to a smart phone of a user, comprising:

a) a handle and a shaft;

b) the finding unit having a power supply and a wireless transmitter, said finding unit being attached to the cane or contained within the cane, wherein the wireless transmitter transmits a wireless signal continuously;

c) a software application and a GPS receiver in the smartphone of the user, wherein the smartphone receives said wireless signal directly from the wireless transmitter in the finding unit continuously when the smartphone is within range of the wireless transmitter; wherein the GPS receiver continuously monitors the location of the smart phone; wherein the software application of the smartphone sends a notification directly to a display of the smartphone that no wireless signal is being detected, at the time when the smartphone does not receive said wireless signal directly from the wireless transmitter in the finding unit; wherein the GPS receiver directly displays on the display of the smartphone the location of the smartphone at the time when the smartphone most recently did not receive said wireless signal directly from the wireless transmitter in the finding unit; wherein the software application continuously verifies reception of said wireless signal from the wireless transmitter; and wherein, when said wireless signal is not received by the smartphone, said notification is also sent to a provider server and to other smartphones; and d) an icon is displayed on the display of the smart phone at the time when the smartphone most recently did not receive said wireless signal directly from the wireless transmitter in the finding unit, said icon being used to call an emergency number when the icon is selected by the user.

20. The cane of claim 19, further comprising a wireless receiver within the finding unit to receive a wireless signal from the smart phone to generate an alert from one or more alert devices on or in the cane.

21. The system of claim 19 wherein the software application is downloaded into the smartphone from a provider server and provides on said display a selection of icons which provides commands to find said location; to allow entry of contact information by a user; to send said notification to contacts selected from said contact information; and to activate one or more alert devices on or in the cane.

22. A cane having a finding unit with a wireless connection to a smart phone of a user, comprising:
a) a handle and a shaft;
b) the finding unit having a power supply and a wireless transmitter, said finding unit being attached to the cane or contained within the cane, wherein the wireless transmitter transmits a wireless signal continuously;
c) a software application and a GPS receiver in the smartphone of the user, wherein the smartphone receives said wireless signal directly from the wireless transmitter in the finding unit continuously when the smartphone is within range of the wireless transmitter; wherein the GPS receiver continuously monitors the location of the smart phone; wherein the software application of the smartphone sends a notification directly to a display of the smartphone that no wireless signal is being detected at the time when the smartphone does not receive said wireless signal directly from the wireless transmitter in the finding unit; wherein the GPS receiver directly displays on the display of the smartphone the location of the smartphone at the time when the smartphone most recently did not receive said wireless signal directly from the wireless transmitter in the finding unit; wherein the software application continuously verifies reception of said wireless signal from the wireless transmitter; and wherein, when said wireless signal is not received by the smartphone, said notification is also sent to a provider server and to other smart phones;
d) an icon is displayed on the display of the smart phone at the time when the smartphone most recently did not receive said wireless signal directly from the wireless transmitter in the finding unit, said icon being used to call an emergency number when the icon is selected by the user;
e) a wireless receiver attached to or contained within the finding unit to receive a wireless signal from the smart phone to generate an alert from one or more alert devices on or in the cane; and
f) the software application is downloaded into the smartphone from a provider server and provides on said display a selection of icons which provides commands to find said location; to allow entry of contact information by a user; to send said notification to contacts selected from said contact information; and to activate one or more alert devices on or in the cane.

\* \* \* \* \*